US012747613B2

(12) United States Patent
Kölliker et al.

(10) Patent No.: US 12,747,613 B2
(45) Date of Patent: Sep. 29, 2026

(54) ELECTROMECHANICAL INSTALLATION DEVICE FOR INSERTING INTO A CLOSED CYLINDER-TYPE CLOSING DEVICE

(71) Applicant: DORMAKABA SCHWEIZ AG, Wetzikon (CH)

(72) Inventors: Marcel Kölliker, Wetzikon (CH); Franco Di Sario, Wetzikon (CH); Markus Zahner, Wetzikon (CH)

(73) Assignee: DORMAKABA SCHWEIZ AG, Wetzikon (CH)

( * ) Notice: Subject to any disclaimer, the term of this patent is extended or adjusted under 35 U.S.C. 154(b) by 177 days.

(21) Appl. No.: 18/714,894

(22) PCT Filed: Dec. 2, 2022

(86) PCT No.: PCT/EP2022/084206
§ 371 (c)(1),
(2) Date: May 30, 2024

(87) PCT Pub. No.: WO2023/099731
PCT Pub. Date: Jun. 8, 2023

(65) Prior Publication Data

US 2025/0027339 A1 Jan. 23, 2025

(30) Foreign Application Priority Data

Dec. 3, 2021 (EP) .................................... 21212259

(51) Int. Cl.
*E05B 47/00* (2006.01)
*E05B 27/00* (2006.01)

(52) U.S. Cl.
CPC ...... *E05B 47/0012* (2013.01); *E05B 27/0007* (2013.01); *E05B 27/0014* (2013.01)

(58) Field of Classification Search
CPC .. E05B 47/00; E05B 47/0012; E05B 27/0007; E05B 27/0014; Y10T 70/7028; Y10T 70/7588

(Continued)

(56) References Cited

U.S. PATENT DOCUMENTS 6,155,089 A * 12/2000 Hurskainen ......... E05B 47/0642 70/366
6,374,653 B1 * 4/2002 Gokcebay .......... G07C 9/00944 70/277

(Continued)

FOREIGN PATENT DOCUMENTS

AT 522045 A2 7/2020
CH 717289 A2 10/2021

(Continued)

OTHER PUBLICATIONS

International Search Report for Application No. PCT/EP2022/084206, dated Feb. 24, 2023, 2 pages.

(Continued)

*Primary Examiner* — Suzanne L Barrett
(74) *Attorney, Agent, or Firm* — CANTOR COLBURN LLP

(57) ABSTRACT

An electromechanical installation device for insertion into a lock cylinder-like locking device is provided with a stator for insertion into a locking device housing and with a rotor as components, as well as with a locking element. The rotor is mounted in the stator. The locking element is mounted in one of the components and can be moved between two positions. In the first position, the locking element connects the rotor and the stator and blocks a rotation of the rotor in the stator. In the second position, the locking element allows a rotation of the rotor in the stator. A locking cylinder-like locking device includes such an installation device. In a locking device system with locking devices, the locking (Continued)

devices each have an installation device. The installation devices are each designed identically. In particular, the locking devices have locking device housings which are different from one another.

17 Claims, 7 Drawing Sheets

(58) Field of Classification Search
USPC .......................................................... 70/277
See application file for complete search history.

(56) References Cited

U.S. PATENT DOCUMENTS

| | | | | |
|---|---|---|---|---|
| 6,474,122 | B2 * | 11/2002 | Davis | E05B 47/0615 70/369 |
| 6,564,601 | B2 * | 5/2003 | Hyatt, Jr. | E05B 47/063 70/369 |
| 6,615,625 | B2 * | 9/2003 | Davis | E05B 47/063 70/389 |
| 7,870,769 | B2 * | 1/2011 | Andersson | E05B 47/063 70/278.3 |
| 7,966,854 | B2 * | 6/2011 | Imedio | E05B 47/0642 192/69.62 |
| 8,047,031 | B2 * | 11/2011 | Bellamy | E05B 47/0011 70/283.1 |
| 8,276,414 | B2 * | 10/2012 | Luo | E05B 47/063 70/283.1 |
| 8,973,417 | B2 * | 3/2015 | Bench | E05B 9/086 70/278.1 |
| 11,933,076 | B2 * | 3/2024 | Allen | G07C 9/00174 |
| 12,516,545 | B2 * | 1/2026 | Kölliker | E05B 47/063 |
| 2019/0153752 | A1 * | 5/2019 | Pagnoncelli | G07C 9/00817 |

FOREIGN PATENT DOCUMENTS

| | | | | |
|---|---|---|---|---|
| CN | 103255958 A | | 8/2013 | |
| CN | 111094677 A | | 5/2020 | |
| CN | 111133163 A | | 5/2020 | |
| DE | 102013103051 A1 | | 10/2014 | |
| EP | 1914368 B1 | | 6/2018 | |
| WO | 03100199 A1 | | 12/2003 | |
| WO | WO-2013050946 A1 | * | 4/2013 | E05B 19/043 |

OTHER PUBLICATIONS

Written Opinion for Application No. PCT/EP2022/084206, dated Feb. 24, 2023, 3 pages.

* cited by examiner

ELECTROMECHANICAL INSTALLATION DEVICE FOR INSERTING INTO A CLOSED CYLINDER-TYPE CLOSING DEVICE

CROSS-REFERENCE TO RELATED APPLICATIONS

This application is a 35 U.S.C. § 371 National Stage patent application of PCT/EP2022/084206, filed on 2 Dec. 2022, which claims the benefit of European patent application 21212259.2, filed on 3 Dec. 2021, the disclosures of which are incorporated herein by reference in their entirety.

TECHNICAL FIELD

The disclosure relates to an electromechanical installation device for insertion into a locking cylinder-like locking device or into a switching element according to the independent claim. Furthermore, the disclosure relates to a locking cylinder-like locking device equipped with such an installation device. Lastly, the disclosure relates to a locking device system with a plurality of locking devices, each of which comprises an installation device.

BACKGROUND

EP 1 914 368 B1 discloses a locking cylinder as a locking device with a locking element which, in a first position, is located both in a rotor and in a locking cylinder housing and thus blocks a rotation of the rotor relative to the locking cylinder housing. The locking element engages into a recess in the locking cylinder housing. In a second position of the locking element, however, the locking element is located fully in the rotor such that the rotor can rotate relative to the locking cylinder housing. The disadvantage of this is that the locking cylinder housing must have a recess for the locking element. Therefore, each individual different locking cylinder housing must have a recess.

SUMMARY

The present disclosure further develops components for a locking device, a locking device and a locking device system to the extent that it can be manufactured more easily and/or flexibly.

This is achieved by providing the limitations set forth in the independent claim. Advantageous further developments of the device are indicated in the dependent device claims, the description and in the figures. Furthermore, the advantages of the disclosure are also achieved by providing a locking device according to the claims. Advantageous further developments of the locking device are indicated in the associated dependent device claim, the description and in the figures. In addition, the advantage is also achieved by providing a locking device system according to the claims. Advantageous further developments of the locking device system are indicated in the description and in the figures. Features and details described in connection with the installation device according to the disclosure thereby also apply in connection with the locking device according to the disclosure and/or the locking device system vice versa. In this case, the features mentioned in the description and in the claims may each be essential to the disclosure individually by themselves or in combination.

According to the disclosure, an electromechanical installation device is provided for insertion into a locking cylinder-like locking device or into a switching element with a stator with a rotor as components. The stator is designed to be inserted into a locking device housing or a switching element housing. Furthermore, the installation device is provided with a locking element. The rotor is mounted, in particular rotatably, in the stator. The locking element is mounted in one of the components, in particular linearly movably, and can be moved between a first position and a second position. In the first position, the locking element blocks a rotation of the rotor in the stator. In the second position, the locking element allows a rotation of the rotor in the stator.

In the first position, the locking element thereby preferably engages into a locking element recess of the other component. This allows the locking element to preferably connect the rotor and the stator. Because the locking element is partially arranged in the stator at least in the first position and the stator is designed to be inserted into a locking device housing, it is not necessary to provide a recess or bearing for the locking element in the locking device housing. Rather, a separate component is provided with the stator, which is inserted into a locking device housing, and said component cooperates with the locking element and can thus prevent a rotation of the rotor.

The first component can correspond to the rotor or the stator. Accordingly, the second component corresponds to the other of the components, i.e. either the stator or the rotor. Thus, either the locking element can be mounted in the rotor and engage with the stator in the first position, or the locking element is mounted in the stator and engages with the rotor in the first position.

Preferably, the locking element is mounted in the rotor. The stator preferably comprises a locking element recess into which the locking element engages in the first position. That is to say that the locking element is housed in the rotor, which has the advantage that the stator can be designed to be relatively thin. In the second position, the locking element is preferably disengaged from the locking element recess.

Preferably, the locking element projects into the locking element recess in the first position. However, in the first position, the locking element preferably does not protrude beyond the outer circumference of the stator. The locking element is preferably arranged in the first position in an installation space which is delimited by the outer circumference of the stator. Thus, the locking device or switching element housing can be designed free of a recess for the locking element.

It can be provided that the locking element is tensioned in the first position by at least one spring in the direction of the first position. The locking element preferably moves from the first position to the second position in one movement direction. Preferably, the installation device, in particular the stator, comprises a boundary surface on which the locking element rests in the first position and which delimits the movement of the locking element counter to the movement direction, i.e. during a movement into the first position.

The locking device with the installation device is preferably used to bolt a spatial area. In particular, the spatial area is fixed. For example, the spatial area may be a room in a building, for example an office, an apartment or a house, or a storage room, for example a cupboard, a mailbox, a chest, a box, a safe or a drawer. In particular, the locking device is used to be inserted in a particularly door-like closure element, for example a front door, an apartment door, a room door, a cupboard door, a mailbox flap or the front of a drawer, or to be attached to a closure element.

Preferably, the stator of the installation device is at least indirectly connected to the closure element in a rotationally fixed manner. The locking device housing is preferably connected to the closure element in a rotationally fixed manner.

The locking device can have a driver or can be connectable to a driver. A rotation of the rotor of the installation device serves to rotate the driver.

The driver is preferably designed as an eccentric. The driver can be designed as a locking lug. It may be that a rotation of the driver in a first direction serves to transfer the closure element from an unbolted state to a bolted state. It may be that a rotation of the driver in a second direction serves to transfer the closure element from a bolted to an unbolted state. For example, the installation device can be inserted at least indirectly into a mortise lock. In this case, a rotation of the driver can cause the bolt of the mortise lock to move. For example, the rotation of the driver in a first direction can cause the bolt to extend and thus bring about the bolted state of the closure element. A rotation of the driver in a second direction can, for example, cause the bolt to retract and thus bring about the unbolted state of the closure element.

Alternatively, the driver itself can act as a bolt. For example, the rotation of the driver in a first direction can cause the driver to assume a bolting position. The rotation of the driver in a second direction can, for example, cause the driver to assume an unbolting position.

The locking device housing is used in particular for insertion into or attachment to the closure element. The locking device can be designed, for example, as a locking cylinder, in particular as a double cylinder or half cylinder, as a knob cylinder, as a furniture cylinder or as a padlock.

Alternatively, the installation device can be provided for a switching element. This means that the switching element can only be operated by authorised users. A driver of the switching element can be used here to actuate a switch or button. Thus, the installation device can be used in a switching element, in particular in a key switch, or correspond to a key switch.

The installation device, in particular the rotor, can be connected or connectable to a knob or a key in order to transmit a mechanical torque to the rotor. If cooperation with a key is intended, the installation device, in particular the rotor, can comprise a key channel.

It is preferably provided that the installation device comprises a connecting section for being connected to a driver.

The electromechanical installation device comprises an electromechanical actuator. The actuator can in particular be designed as an electric motor.

The actuator is used to enable the driver to move when the rotor rotates.

The actuator is used to enable the locking element to be moved into the second position.

The installation device can comprise an electronic control device, in particular a processor and/or a controller, to control the actuator. The control device can comprise an electronic memory.

The installation device can comprise a transmission device. The transmission device can be designed as a transmitting and receiving unit, as a biometric sensor, as a keypad for inputting a PIN and/or as a contact element for making electrical contact with an in particular electronic key. The transmitting and receiving unit can be designed to communicate with a mobile unit, in particular a mobile telephone or a card, by wireless near-field communication, in particular RFID or Bluetooth Low Energy.

The transmission device can be used to send and/or receive electronic data that make it possible to determine a user's authorisation to unbolt the spatial area. For example, the transmission device can receive an authorisation code and/or an authorisation time window that is verified by the control device. If the verification is completed with a positive result, the actuator can be controlled to allow a rotation of the driver.

Alternatively, the transmission device can transmit an opening command. Based on the opening command, the actuator can be controlled to allow a rotation of the driver. For example, based on the opening command, the locking element can be moved electromechanically into the second position or the movement into the second position can be released electromechanically.

The transmission device serves in particular additionally or alternatively to transmit electrical energy to the installation device. The electrical energy can be provided for actuating the actuator and/or the control device.

Preferably, the installation device according to the disclosure comprises a blocking element. The blocking element can be moved by the actuator into a release position. An actuator assembly of the installation device comprises the blocking element, the actuator and the locking element.

It is preferably provided that the blocking element allows the movement of the locking element from the first position into the second position in a release position and prevents the movement of the locking element from the first position into the second position in a blocking position.

In particular, it can be provided that when the blocking element is located in the release position, the rotation of the rotor allows a movement of the blocking element into the second position. In particular, the stator pushes the locking element into the second position.

Preferably, the blocking element comprises a recess into which the locking element is arranged in the second position. In the first position, however, the locking element is located outside the recess. In the release position, the blocking element is arranged such that the recess is located opposite the locking element such that the locking element can retract into the recess.

The actuator preferably serves to allow a movement of the blocking element from the blocking position into the release position. The actuator can thus move the blocking element into the release position and/or, for example, cause the blocking element to move into the release position by tensioning a spring.

The blocking element can be designed to be disc-shaped, for example.

The blocking element can be movable, in particular rotatable, between the release position and the blocking position.

It can be provided that the blocking element is arranged on the output shaft of the actuator designed as an electric motor. Preferably, the actuator allows a rotation of the blocking element from the blocking position into the release position. Preferably, the actuator rotates the blocking element from the blocking position into the release position. This allows for a very space-saving design.

Preferably, the rotor houses the electromechanical actuator and/or the blocking element.

In the installation device, the stator can be designed to be cylindrical. This is advantageous for assembly in a locking device housing. Preferably, the stator can comprise at least one opening which is designed to receive a fastening element passed through the locking device housing for the rotationally fixed fastening of the stator to the locking device housing. This is a very simple method for fastening the stator.

The stator can comprise a plurality of openings to receive a fastening element inserted into different locking device housings. This increases the flexibility of use of the installation device.

The rotor can comprise a connecting section which is designed to be directed towards a driver of the locking device in the installed state.

The rotor can be designed to form an operative connection with a coupling part. The coupling part can be designed to be able to be brought into engagement with the driver. This creates the operative connection between the installation device, in particular the rotor of the installation device, and the driver. The locking device can comprise the coupling part.

Preferably, the connecting section comprises a guide for the coupling part.

The connecting section preferably protrudes beyond the stator.

Preferably, the stator comprises a stator body and a cover. The cover preferably encloses the stator body at least partially.

It can be provided that the at least one opening is designed in the stator body and in the cover.

The stator can comprise a stator insert element. The stator insert element preferably at least partially comprises the aforementioned locking element recess.

Preferably, the stator insert element is inserted into the stator body. It may be that the stator insert element is covered by the cover from the outside. This makes assembly easy.

In particular, the locking element recess can comprise a contact surface. The contact surface and the locking element are preferably designed in such manner that the locking element is spaced apart from the blocking element by the contact with the contact surface. The distance enables the locking element to operate almost wear- and damage-free over time. Additionally or alternatively, it can be provided that the locking element remains in the first position by contact with the contact surface.

It can be provided that the stator insert element comprises the contact surface.

It may be that the stator comprises a stator element having a further contact surface for the locking element in order to move the locking element from the first position into the second position.

Preferably, the stator element is movably mounted in the rest of the stator.

The stator comprises in particular an annular projection which is received in the rotor and/or projects into the key channel. The projection is interrupted in at least one section by a gap in order to cooperate with a key in a bayonet-like manner as a key removal lock. The annular projection is preferably divided into at least a first protective element part and a second protective element part. The first and the second protective part element part are preferably designed separately from each other. Preferably, the first and second protective element part are pushed towards each other by a spring device.

The spring device is designed in particular as a leaf spring which is adapted to the contour of the protective element parts. The leaf spring particularly advantageously sits on the outer surface of the first and second protective element parts and presses them against each other such that the spring device is designed like a clip.

In particular, the spring device compresses the gap in a certain way towards a smaller gap size. Due to its design as a leaf spring, the spring device is designed to be particularly space-saving. For example, the spring device can be designed to be curved, in particular in the form of an open ring.

The spring device allows the protective element parts to be clamped to the rotor. This results in a simple assembly.

Preferably, the installation device comprises an extension element. The extension element is designed to move in a first direction axially to a rotor axis of the rotor when a key is inserted and to move in a second direction counter to the first direction axially to the rotor axis when the key is removed. This makes it possible to have the installation device carry out certain actions simply by inserting the key. Thus, the extension element extends the effective range of the key. The key channel can therefore be designed to be particularly short.

The extension element can be moved, in particular linearly, between an insertion position and a removal position in the axial direction.

If the extension element moves linearly, the extension element can alternatively be referred to as a slider.

The extension element is preferably moved from the removal position into the insertion position when a key is inserted and/or moved from the insertion position into the removal position when a key is removed.

Because this task is performed by the extension element as part of the locking device, it is possible to better protect the interior of the locking device against manipulation. In this case, the locking device can comprise at least one wall behind which the extension element is at least partially arranged. “Behind” is to be understood from the perspective of the user who operates the locking device. The insertion position is thereby a position in which the extension element is further away from the user than in the removal position. The wall can delimit a key channel to the rear.

The extension element preferably travels through the essential length along the rotor axis of the locking device and is received axially movable with respect to the rotor axis.

The extension element is located in the interior of the locking device where the actuator and the locking element are located. Thus, in particular the control device, the actuator, the blocking element and/or the locking element are protected against manipulation by the wall.

It is preferably provided that each insertion movement of a key into an end position acts on the extension element. In particular, each insertion movement of the key into an end position acts on the extension element in such manner that the extension element is moved from the removal position into the insertion position.

It can be provided that the locking device comprises a force accumulator, in particular a spring, in order to push the extension element into the removal position. Preferably, the extension element comprises an engagement element for engaging the key. This makes it possible for the extension element to always be moved from the insertion position into the removal position when the key is removed.

The extension element is preferably designed to displace the coupling part.

The extension element is in particular designed to be movable independently of the coupling part. Independently here means that a movement of the extension element cannot be transferred to the coupling part via a connection with the coupling part. However, the independent movement of the extension element from the coupling part includes that the coupling part follows a movement of the extension element, for example because the coupling part is preloaded in the direction of the extension element by a spring.

In particular, the extension element is designed in the axial direction without a form-fitting connection to the coupling part.

The coupling part can preferably be arranged outside the stator, in particular in the guide of the rotor.

It can be provided that the coupling part remains in a coupling position when the extension element moves in the second direction. In the coupling position, the coupling part is in operative connection with the driver. In a decoupling position, the coupling part is out of operative connection with the driver. Because the coupling part remains in the coupling position when the extension element is moved into the removal position, an operative connection remains between the rotor and the driver after the key is removed. Since the locking element blocks a movement of the rotor after the key is removed, the locking element simultaneously blocks a movement of the driver. This protects the driver from manipulation. The coupling part can comprise a coupling element. The coupling element can establish the operative connection between the rotor and the driver. The coupling element can in particular be guided in the guide of the rotor. Preferably, the coupling element remains in the coupling position, i.e. in operative connection with the driver, when the extension element moves into the removal position. The coupling element thus ensures that the coupling position is maintained. Preferably, the extension element can be moved independently of the coupling element.

Preferably, the installation device comprises a front side which faces outwards in the installed state. When the installation device is in the assembled state, the locking element is arranged between the front side and the coupling part. In addition, the locking element is arranged between the front side and the guide for the coupling part.

It can be provided that the actuator is arranged in the assembled state of the installation device between the front side and the guide for the coupling part.

It is preferably provided that each insertion movement of the key into an end position acts on the extension element.

It can be provided that the extension element acts on the coupling part without an intermediate force accumulator. A force accumulator, in particular a spring, can be provided to push the extension element in the second direction. However, the force accumulator is not used to charge itself if the extension element and the coupling part have different movement possibilities, for example if the coupling part cannot operatively connect with the driver due to a current spatial arrangement.

The coupling part is preferably designed in a plurality of parts with a spring. By means of the spring, mechanical energy can be stored in the case of a current spatial arrangement of the coupling part in relation to the driver, which prevents engagement. If the spatial arrangement of the coupling part to the driver allows engagement, the coupling part engages by means of the spring force of the spring of the coupling part.

It is preferably provided that a torque can be transmitted from the rotor to the coupling part without the extension element transmitting the torque. This makes it possible to design the extension element in a filigree manner and to save installation space.

The extension element can be designed to cooperate with the coupling part in the direction of rotation without a form-fitting connection. This prevents the extension element from transferring the torque to the coupling part.

The extension element can be designed to cooperate with the coupling part without a form-fitting connection.

The extension element is preferably designed in one piece.

The extension element is preferably designed to be angled. It can be provided that a first part of the extension element, which is intended to interact with the key, extends radially further outwards than a second part of the extension element, which is intended to interact with the coupling part. The advantage is that the second part is more central so that the coupling part can be pushed better. This keeps the dimensions, in particular of the coupling part, small.

Preferably, the stator comprises a base side which is designed to be directed inwards and/or towards the aforementioned driver of the locking device in the installed state. The base side is preferably designed to face away from a key channel or knob and/or from the front side.

The rotor preferably comprises a projection which rests on the base side. In particular, the projection is designed in one piece with a connecting section. Additionally or alternatively, the projection can be designed in one piece with a guide for the locking element. Additionally or alternatively, the projection can be designed in one piece with an installation space for the blocking element, for the actuator and/or for the control device. Additionally or alternatively, the projection can be designed in one piece with an installation space for the actuator assembly.

The rotor can be divided into a first section and a second section. A first section can be directed towards the front side and a second section can be directed towards the base side.

It can be provided that sections of the rotor have different diameters. Preferably, the first section of the rotor can have a larger diameter than a second section of the rotor.

Accordingly, it is conceivable that the stator has different wall thicknesses. For example, the wall thickness of the stator where the stator surrounds the first section of the rotor can be smaller than the wall thickness of the stator where the stator surrounds the second section of the rotor.

It can be provided that the first section is made of a different material, in particular of a harder and/or stronger material, than the second section. In particular, the first section can be designed of a ceramic material and/or serve as a drilling protection.

The second section preferably receives the electromechanical actuator and/or the control device for controlling the actuator.

The second section preferably receives the blocking element.

Preferably, the locking element is mounted in the second section.

Preferably, the at least one opening, preferably the plurality of openings, for the fastening element is arranged where the stator surrounds the second section.

The first section houses in particular the transmission device and/or the key channel.

It is preferably provided that the extension element extends from the first section to the second section.

It may be that the rotor comprises a first rotor element and a second rotor element. Preferably, the first rotor element and the second rotor element are reversibly detachably connected to one another. The first rotor element can comprise the first section. The second rotor element can comprise the second section.

It can be provided that the first rotor element comprises an end surface facing the second rotor element. The end surface can preferably determine the axial position relative to the stator in one spatial direction.

It can be provided that the second rotor element comprises the projection for resting on the base side.

Due to the projection of the second rotor element and an axial fastening of the first rotor element, for example the end face of the first rotor element or a snap ring, it is possible to insert the first rotor part from the front side and the second rotor part from the base side into the stator, in particular into the stator body. If the first and second rotor parts are connected to one another, the rotor is axially fixed to the rotor axis.

In particular, the rotor elements can be reversibly detachably connected to one another. The reversibly detachable connection can be established by a form- and/or force-fitting connection. The reversible detachability can be provided in particular in the direction of rotation, preferably also in the axial direction. That is to say that a defective rotor element can be replaced.

It can be provided that the first rotor element comprises a first fastening means and the second rotor element comprises a second fastening means, with the rotor elements being fastened to one another in the direction of rotation by the first and the second fastening means in a form-fitting and/or force-fitting manner, preferably in a form-fitting manner.

It can be provided that the first and the second rotor element are connected to one another at least indirectly in the axial direction by a form-fitting and/or force-fitting connection, preferably a form-fitting connection, for example a latching connection. The locking device can comprise a latching device, with the first rotor element and the second rotor element being connected to one another via the latching device. The latching device can provide the latching connection. For example, both the first rotor element and the second rotor element are clipped to the latching device.

The disclosure also provides a locking cylinder-like locking device with an inserted installation device according to the disclosure. The installation device can be designed as described in the context of this disclosure.

The locking device preferably comprises a fastening element which is inserted from the outside through a recess of the locking device into the locking device housing in order to fasten the stator to the locking device housing in a rotationally fixed manner. The fastening element is preferably designed as a screw or a clamping bolt.

The locking device housing is preferably designed free of the locking element recess.

The locking device can comprise the coupling part. The coupling part is preferably designed in a plurality of parts. The coupling part can comprise a sliding element. The sliding element is actuated by the extension element. The coupling part can comprise the coupling element. Preferably, the coupling element establishes the operative connection with the driver. The coupling part can comprise a spring, with the spring being arranged between the sliding element and the coupling element. The spring can absorb a mechanical force when the sliding element is moved by the extension element, but the movement cannot be transferred to the coupling element. This can occur in a spatial arrangement in which the coupling element cannot be brought into operative connection with the driver. This makes it possible for each movement of the key to act on the extension element and/or for the extension element to be designed in one piece.

The locking device can comprise the driver.

Lastly, the disclosure provides a locking device system with a plurality of locking devices according to the disclosure. The locking devices can thereby be designed as described in the context of this disclosure. Their installation devices are advantageously designed identically. In particular, the locking devices comprise locking device housings that are different from one another. For example, one locking device can be designed as a double cylinder and another locking device as a half cylinder. In another example, one locking device can be designed as a double cylinder and another locking device can be designed as a furniture cylinder or as a padlock.

Preferably, the installation device is free of mechanical coding. That is to say that the locking authorisation is based exclusively on the electronic data that is sent and/or received from the installation device via the transmission device. This makes it possible, in particular, to design the installation devices to be identical.

Preferred exemplary embodiment of the disclosure

The disclosure will be explained in more detail below using an exemplary embodiment. Technical features with the same function are provided with identical reference numerals in the figures. They show:

BRIEF DESCRIPTION OF THE DRAWINGS

The disclosure will be explained in more detail below using exemplary embodiments. Technical features with the same function are provided with identical reference numerals in the figures. They show.

DETAILED DESCRIPTION OF THE DRAWINGS

Figure 1:
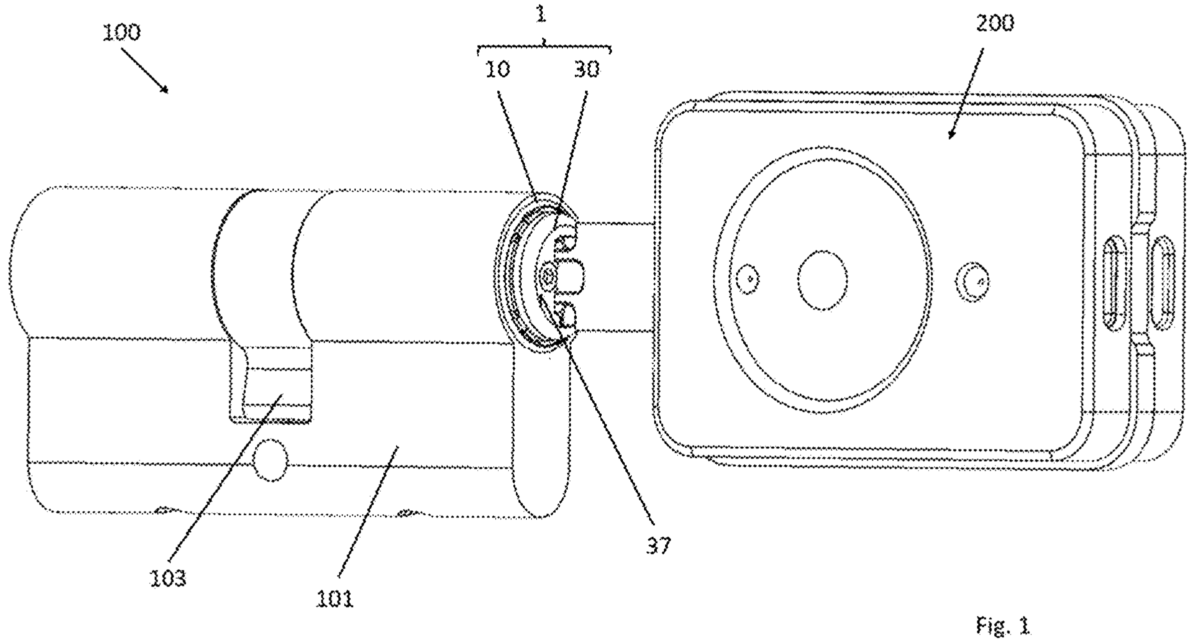
FIG. 1 a locking device according to the disclosure with an installation device according to the disclosure and a key according to a first exemplary embodiment, FIG. 2 the locking device from FIG. 1, partially disassembled, FIG. 3 the installation device from FIG. 2, which is designed as an installation device and is also part of a locking device according to the disclosure, without a cover, and a coupling part FIG. 4 the installation device from FIG. 3 without cover and stator body in partially dismantled state, FIGS. 5 and 6 selected elements of the installation device from FIG. 4, FIG. 7 an installation device according to the disclosure in accordance with a second exemplary embodiment in a partially dismantled state without a cover, and a stator body in a partially dismantled state, FIG. 8 a longitudinal section through the installation device according to FIG. 7, FIG. 9 a second rotor element of the installation device from FIG. 7

FIG. 1 shows a locking device 100 in the form of a locking cylinder, as used in mortise locks, in order to be able to unbolt or bolt a building door as a closure element by means of a bolt. For this purpose, the locking device 100 has a housing 101 with a recess in which a driver 103, which is designed as a locking lug, is rotatably arranged. The driver 103 is used to move a bolt in the bolting or unbolting direction.

In the right half of the housing 101, an installation device 1 according to a first exemplary embodiment of the disclosure is inserted.

According to the disclosure, the installation device 1 comprises its own stator 10, which is inserted into a locking device housing 101. This makes it possible to design the installation device 1 independently of the installation situation on the closure element. Thus, on the one hand, a locking device housing 101 is provided which is adapted to the closure element and, on the other hand, a generic installation device which can be inserted into various locking device housings 101. The installation device 1 here comprises those elements which are necessary for blocking a movement of the driver 103 and for releasing the movement of the driver 103.

In this way, a locking device system according to the disclosure that is easy to manufacture and has a plurality of locking devices 100 can also be provided. In this case, installation devices 1 according to the disclosure are inserted into at least two of the following different locking device housings: into a locking device housing 101 of a double cylinder with a first length, into a locking device housing 101 of a double cylinder with a second length, into a locking device housing of a half cylinder, into a locking device housing of a furniture lock, into a locking device housing of a padlock. The driver 103 can, for example, act as a bolt itself in the case of a furniture lock.

For this purpose, the installation device 1 comprises the stator 10 arranged on the outside circumference, in which a rotor 30 of the installation device 1 is inserted so as to be rotatable about a rotor axis 35, which, for example, corresponds to the axis of rotation of the driver 103. The rotor 30 comprises, on its front side 37 facing away from the driver 103, a key channel 36 for inserting a shank of a key 200. The key 200 carries an electronic secret locking code in the form of electronic data. The secret locking code can be used to determine a user's authorisation to unbolt the door.

The key 200 is preferably designed without a mechanical coding. Accordingly, the installation device 1 according to the disclosure is designed without a mechanically coded tumbler. Therefore, only the electronic secret locking code can be used to determine whether or not the user has authorisation. The keys 200 and the installation devices 1 can be mechanically identical to one another here. This increases the generic application possibilities of the installation device 1.

Figure 2:
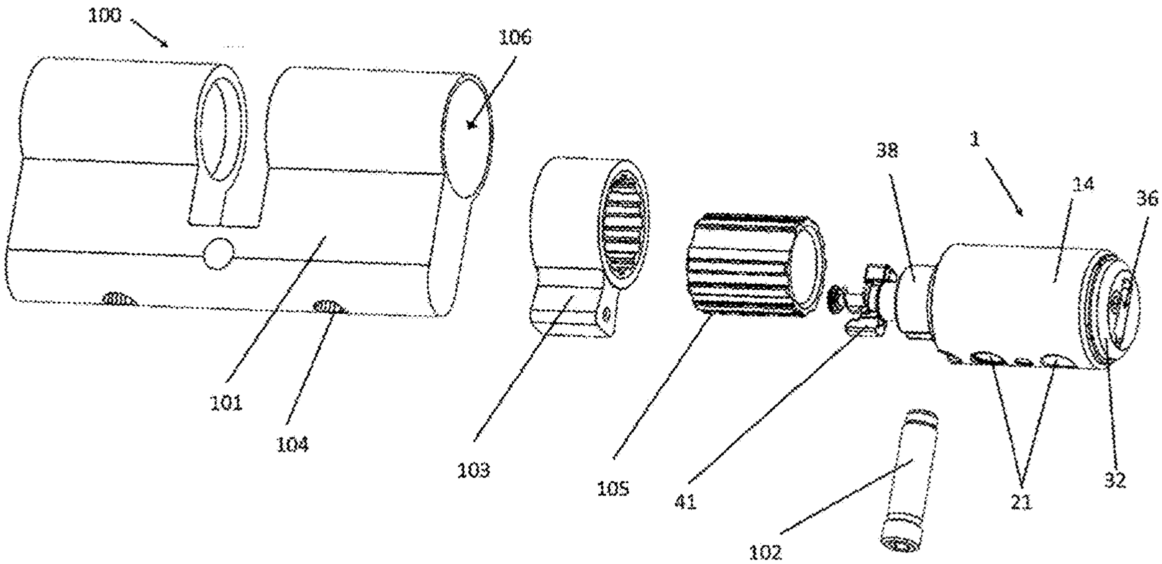

FIG. 2 shows the locking device 100 partially disassembled. The housing 101 has, for example in both halves of the recess for the driver 103, openings 104 in the lower region, of which the right-hand opening is provided with a reference numeral. The openings 104 here extend perpendicular to the axis of rotation of the driver 103. The openings 104 serve to fasten the installation element 1 in the locking device housing 101 by means of a fastening element 102.

The driver 103 has, for example, an inner contour that is not circular in cross-section, for example in the form of an internal toothing, into which an insert 105 engages preferably in a form-fitting manner. For this purpose, the insert 105 has an outer contour that is preferably complementary to the inner contour of the driver 103, here in the form of an external toothing, such that both parts 103, 105 are arranged in a rotationally fixed manner with respect to one another.

A connecting section 38 of the installation device 1 projects into the insert 105. In the connecting section 38, a coupling part 41 is arranged in a guide 42 so as to be slidable. The coupling part 41 is designed in a plurality of parts. Depending on the position of the coupling part 41, the coupling part 41 can establish or release an operative connection between the rotor 30 and the driver 103, in particular via the insert 105. For this purpose, the coupling part 41 of the locking device 100 can engage in a form-fitting manner into an inner contour of the insert 105 not represented here. The guide 42 preferably forms a linear guide for the coupling part 41, such that the coupling part 41 is arranged to be movably guided along the rotor axis 35 of the rotor 30. In a coupled state, the coupling part 41 is located both in the guide 42 and in operative connection with the driver 103, with the coupling part 41 being slightly disengaged. In the decoupled state, the coupling part 41 is located set back in the guide 42 such that the operative connection with the driver 103 is cancelled.

The installation device 1 is in particular designed in such manner that different coupling parts 41 can interact with the installation device 1. In particular, different coupling parts 41 can be arranged in the guide 42. This allows different functions to be achieved in the locking device. The guide 42 is arranged outside the stator 10 such that different coupling parts 41 can be easily inserted.

If the installation device 1 is to be rigidly connected to the driver 103, this can also be done by means of the guide 42. In this case, a connecting element, not represented, can be inserted into the guide 42, which establishes the rigid connection to the driver. It is also possible to insert a cam into the guide 42, which always rotates with the rotor 30, but only drives the driver 103 within a predetermined angular range.

The installation device 1 has a cover 14 with which the installation device 1 is inserted into an associated insertion opening 106 of the housing 101. The fastening element 102, here for example in the form of a screw, is screwed through the right-hand recess 104 from the underside of the housing 101 and through a left-hand opening 21 of the cover 14 of the stator 10 and a stator body 11 of the stator 10, which will be explained in more detail later. The fastening element 102 thus fixes the stator 10 in the housing 101. Furthermore, the key channel 36 for inserting the key 200 is designated here, which is formed in a first rotor element 32 of the rotor 30.

The opening 21 is formed both in the cover 14 and in the stator body 11.

The opening 21 is provided in a part of the stator body 11 which has a greater wall thickness than another part of the stator body 11. Here, the opening 21 is formed in the part of the stator 10 with the greater wall thickness such that a secure fastening of the installation element 1 in the locking device housing 101 is provided. Preferably, a plurality of openings 21 are provided in order to fasten the installation device 1 in different locking device housings 101 and/or with different fastening elements 102 (see FIGS. 2 and 8).

The rotor 30 is freely rotatable in the stator body 11 of the stator 10, but is mounted stationary in the direction of its rotor axis 35, which runs parallel to the insertion direction of the key 200 into the key channel 36.

Figure 3:
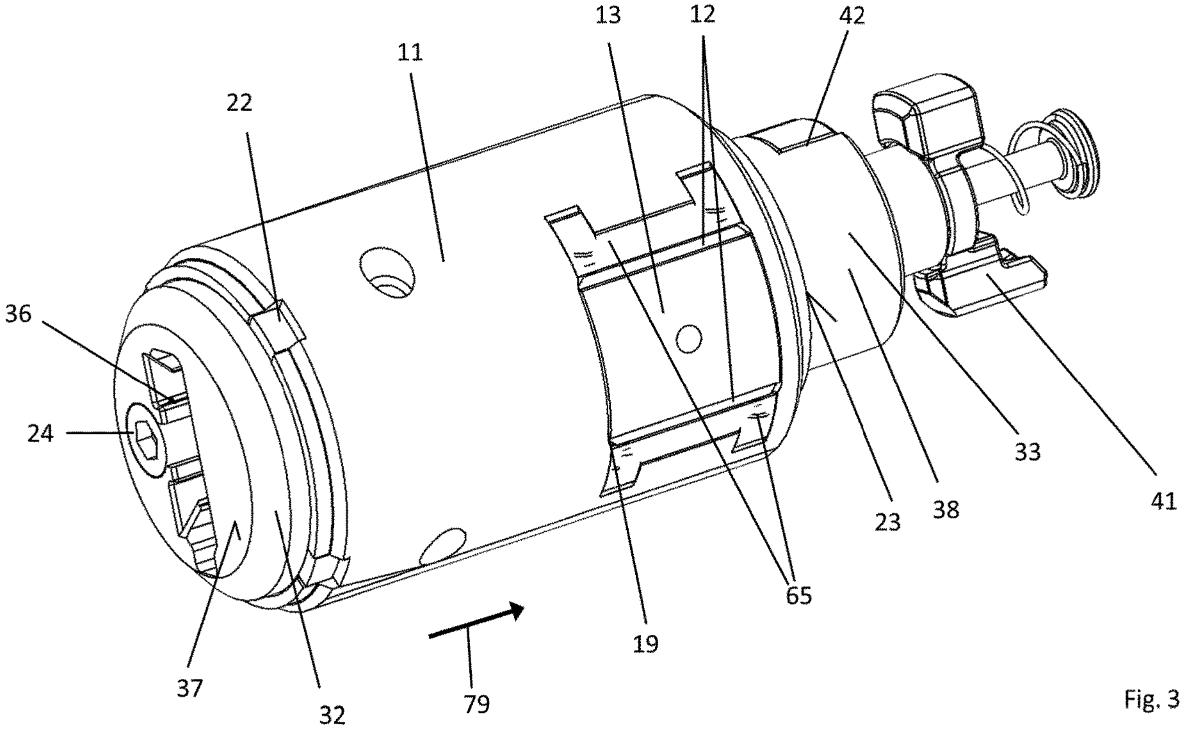

FIG. 3 shows that the stator 10 is designed to be cylindrical. The cover 14, not represented, is here adapted to the contour of the stator body 11 (see also FIG. 8). This makes it particularly easy to insert the stator 10 into different, but easy to manufacture locking device housings 101.

Figure 4:
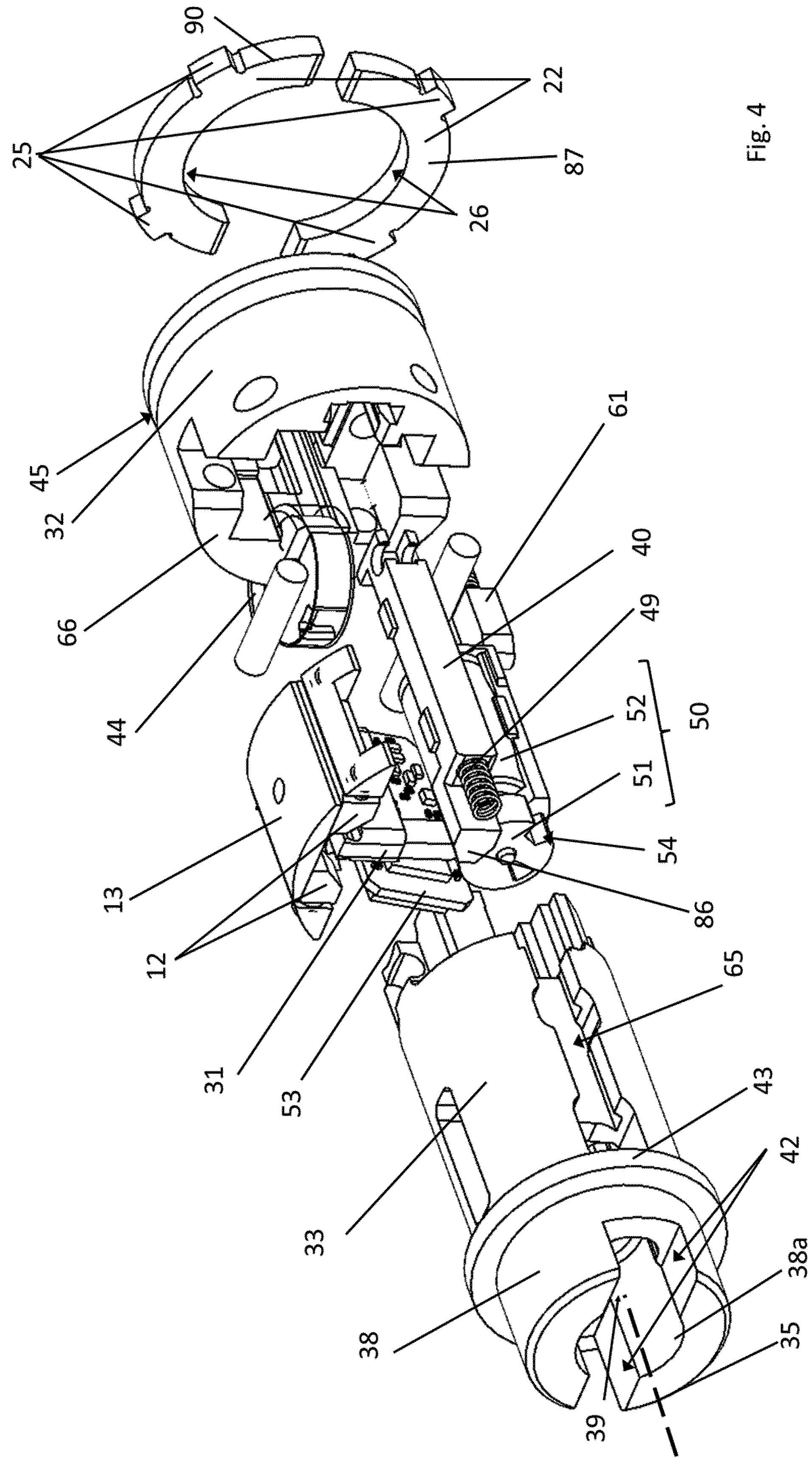

In FIG. 3, the installation device 1 is represented without the cover 14 and the coupling part 41. FIG. 4 shows the installation device 1 without cover 14 and without stator body 11 in a partially dismantled state.

The rotor 30 comprises a first rotor element 32 and a second rotor element 33. Here, the first rotor element 32 forms a first section of the rotor 30 and the second rotor element 33 forms a second section of the rotor 30.

During assembly, the first rotor element 32 can be inserted into the stator 10 from the front side 37. The first rotor element 32 is fixed axially to the driver 103 in the direction of arrow 79 by an end surface 66 (see FIG. 4) facing the second rotor element 33. Here, the end surface 66 rests on an inner structure of the stator 10, in particular the stator body 11.

A circumferential projection 43 (see FIG. 4) of the second rotor element 33, here as a collar, serves as a stop of the second rotor element 33 on the stator 10. The second rotor element 33 can be inserted from a base side 23 of the stator 10 until the projection 43 rests on the base side 23. The projection 43 is preferably formed in one piece with the second rotor element 33. Due to the one-piece design, the second rotor element 33 can only be inserted into the stator 10 from the base side 23.

The insertion of the rotor 30 or the rotor element 33 from the base side 23 is particularly facilitated by the division into the insert element 1 and the locking device housing 101.

By the projection 43 resting on the base side 23, the second rotor element 33 is fixed axially towards the front side 37 against the direction of the arrow 79. The second rotor element 33 is inserted into the stator 10 from a base side 23 of the stator 10 during assembly without the first rotor element 32. The use of the projection 43 allows additional installation space in the rotor 30.

After insertion, the first and the second rotor elements 32, 33 are connected to one another in a rotationally fixed manner, in particular in a reversibly detachable manner. Due to the division into rotor elements 32, 33, assembly of the rotor 30 is particularly easy. By connecting the two rotor elements 32, 33, the resulting rotor 30 is axially fixed forwards and backwards, i.e. with and against the direction of arrow 79.

The rotor elements 32, 33 are designed to be cylindrical. The first rotor element 32 has an inner contour into which the second rotor element 33 is inserted.

The rotor elements 32, 33 can be made of different materials. For example, the first rotor element 32 is made of a harder or more wear-resistant material than the second rotor element 33. This is in particular useful because the first rotor element 32 is designed to receive the key 200 and is therefore exposed to greater mechanical loads than the second rotor element 33. This also makes it easy to provide drilling protection. For example, the first rotor element 32 can be made of a ceramic material.

The coupling part 41 is arranged in a rotationally fixed manner on the second rotor element 33 of the rotor 30 of the installation device 1. The second rotor element 33 has the guide 42 into which the coupling part 41 engages and is thus arranged in a rotationally fixed manner in relation to the second rotor element 33.

The stator body 11 is designed to be sleeve-like. The first rotor element 32 has a larger diameter than the second rotor element 33. As a result, the part of the stator body 11 that surrounds the second rotor element 33 is formed with a greater wall thickness than the part of the stator body that surrounds the first rotor element 32. As a result, the stator body 11 has a greater wall thickness in the region of the second rotor element 33 than in the region of the first rotor element 32.

Figure 7:
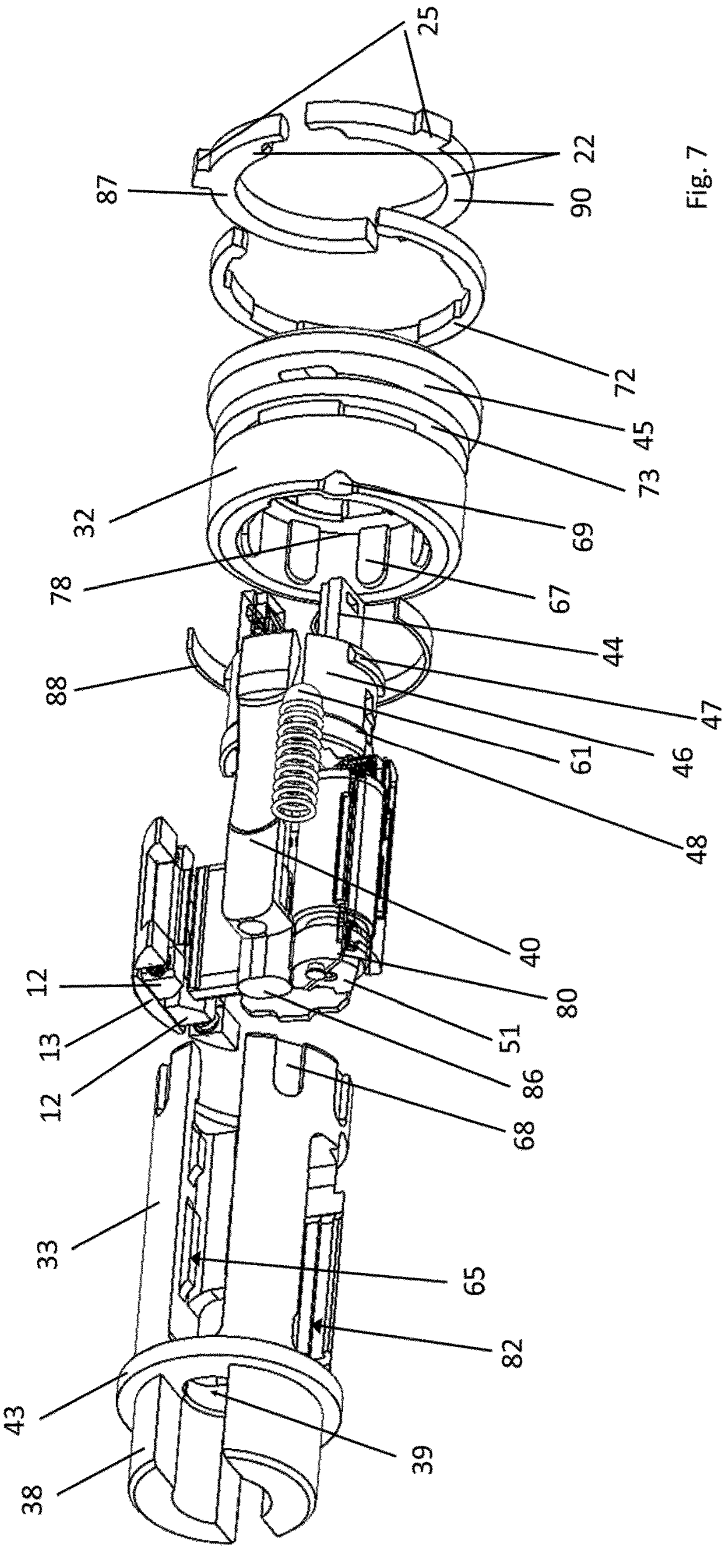

The rotor, in particular the second rotor element 33, houses an actuator assembly 50 in an installation space 82 (see FIG. 7). The actuator group 50 comprises an electromechanical actuator 52, here in the form of an electric motor, on whose output shaft a blocking element 51 is arranged in a rotationally fixed manner. The blocking element 51 comprises a recess 54, which will be explained in more detail later. In addition, the second rotor element 33 houses an electronic control device 53 for controlling the actuator 52.

A locking element 31 is mounted in the rotor 30, in particular in the second rotor element 33, preferably perpendicular to the rotor axis 35, so as to be linearly movable toward and away from the blocking element 51. In a first position shown in FIG. 5, the locking element 31 is located in a locking element recess 15 (see FIG. 5), which is formed by a stator insert element 13 and stator elements 12. As a result, the rotor 30 and thus the coupling part 41 are prevented from rotating relative to the stator 10. Turning the inserted key 200 to unbolt the corresponding lock is blocked or prevented. In a second position of the locking element 31, not represented, the locking element 31 is disengaged from the locking element recess 15 of the stator 10. This makes it possible to rotate the rotor 30 in the stator 10 and thus the driver 103.

The locking element recess 15 is designed to be closed towards the outside, i.e. towards the locking device housing 101. Thus, the locking element 31 is located fully inside the installation device 1 in the first position and in the second position. It is therefore not necessary to provide a locking element recess in the locking device housing 101. In the exemplary embodiments presented here, the locking element recess 15 is delimited outwards at least by the cover 14, preferably also by the stator insert element 13.

The locking element 31 is guided in a guide 81. Because the second rotor element 33 forms the installation space 82 and the guide 81, the projection 43 is integrally connected to the guide 81 and the installation space 82.

The locking element 31 is pushed into the first position by at least one spring 34, preferably a plurality of springs 34. In the exemplary embodiment of FIG. 5, a plurality of springs 34 are provided. The stator, in particular the stator elements 12 and/or the stator insert element 13, delimit the movement of the locking element 31 against the direction of arrow 70. The locking element 31 remains in the installation space delimited by the cover 14. Thus, it is not necessary to provide a locking element recess in the locking device housing 101.

The stator elements 12 and the stator insert element 13 are arranged in the section of the stator 10 that surrounds the second rotor element 33. Due to the small diameter of the second rotor element 33, it is possible to provide the movable stator elements 12 in the stator 10.

Figure 5:
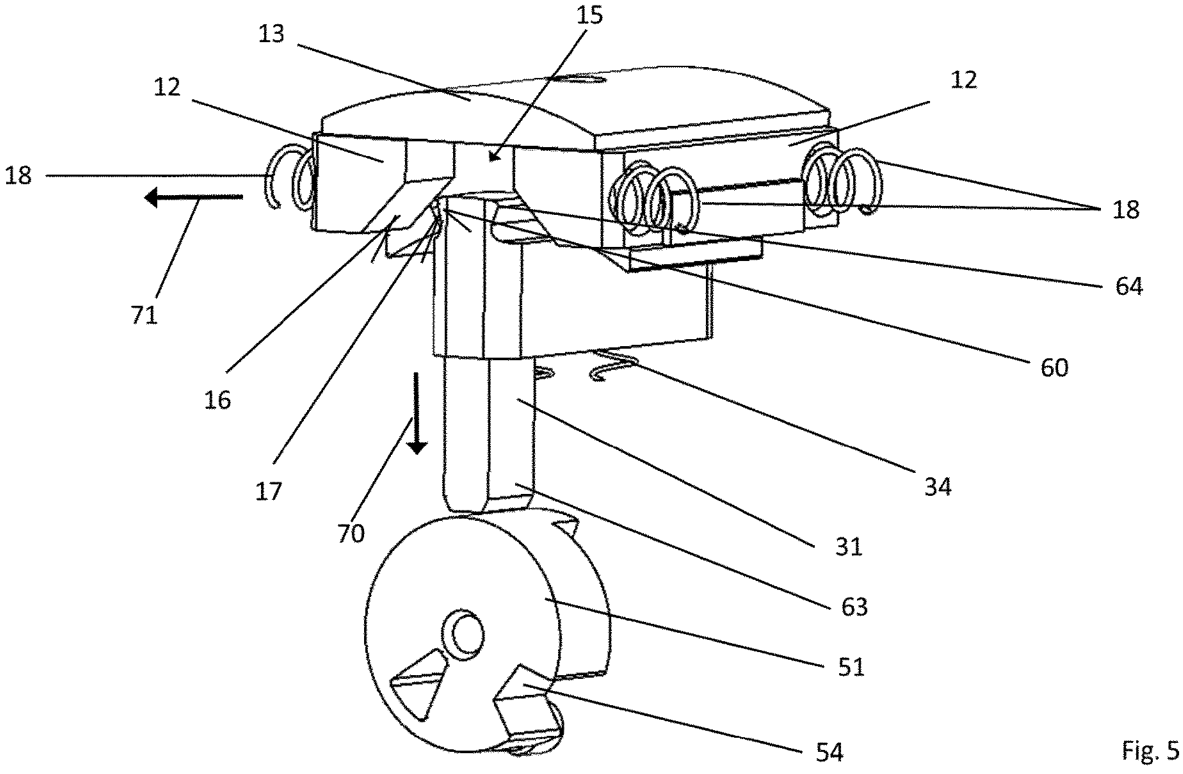

The blocking element 51 is rotatable between a release position in which the recess 54 is located opposite the locking element 31 such that the locking element 31 can retract into the recess 54 and blocking positions in which the recess 54 is not located opposite the locking element 31 such that the locking element 31 is prevented from retracting into the recess 54. FIGS. 4 and 5 represent blocking positions of the blocking element 51.

The locking element 31 is designed at its contact section 63 facing the blocking element 51 to be able to retract into the recess 54 when the blocking element 51 is located in the release position and the recess 54 is located opposite the contact section 63 of the locking element 31, i.e. points upwards in FIG. 5. This makes it possible for the locking element 31 to move into the second position.

A first contact surface 16 of the stator elements 12 facing the locking element 31 is designed to push the locking element 31 in the direction of the blocking element 51 when the rotor 30 rotates, i.e. into the second position in which the rotor 30 is freely rotatable relative to the stator 10. The first contact surface 16 is designed as an inclined surface which pushes the locking element 31 into the second position.

The stator elements 12 are mounted on the stator insert element 13 so as to be movable between a first position and a second position. The stator elements 12 are pushed into the first position by means of spring elements 18. The spring elements 18 are mounted in the stator 10. The movement of the stator elements 12 from the first position into the second position according to the movement direction 71 is perpendicular to the movement direction 70 of the locking element 31.

During a process for unlocking the rotor 30 relative to the stator 10, the locking element 31 is initially located in the locking element recess 15. Here, the locking element 31 is guided in the second rotor element 33. In addition, the locking element 31 rests on the first contact surfaces 16 of the stator elements 12. Thus, the contact surfaces 16 act as boundary surfaces which delimit the movement of the locking element 31 outwards. By contacting the contact surfaces 16, the locking element 31 is centred. This position of the locking element 31 is called the rest position. In the rest position, the locking element 31 is preferably arranged spaced apart from the blocking element 51.

A user now wants to unbolt the door and inserts the key 200 into the key channel 36. This starts an electronic communication between the key and the control device 53, which electronically determines whether the user is authorised.

If the user is authorised to unbolt the door, the control device 53 controls the actuator 52. The actuator 52, designed as an electric motor, rotates the blocking element 51 into the release position in which the recess 54 is located opposite the locking element 31. If the rotor 30 is now started to rotate by means of the key 200, the locking element 31 slides along one of the first contact surfaces 16 into the second position in which the locking element 31 engages into the recess 54. The springs 34 are tensioned here. The locking element 31 is moved in the movement direction 70.

The stator elements 12 remain in the first position here. This is made possible by the fact that the spring elements 18 exert a greater force on the stator element 12, along which the locking element 31 slides, than the springs 34 exert on the locking element 31.

The rotor 30 can now rotate freely. The locking element 31 slides along the first contact surfaces 16 into which the locking element 31 is rotated. The locking element 31 is surrounded by the first contact surfaces 16 in both directions of rotation such that the rotation in both directions when it rests on one of the first contact surfaces 16 causes the locking element 31 to move into the second position. In order to provide first contact surfaces 16 in both directions of rotation, the locking element recess 15 is surrounded on both sides by stator elements 12.

The stator 10 has second contact surfaces 17, which leave the locking element 31 in the first position. The second contact surfaces 17 are used functionally when the user is not authorised to unbolt the door. The second contact surfaces 17 are formed in the stator insert element 13. If the locking element 31 is in the rest position, the second contact surfaces 17 are further away from the locking element 31 than the first contact surfaces 16.

Preferably, the second contact surfaces 17 are also inclined, but opposite to the first contact surfaces 16 with respect to the movement direction 70 of the locking element 31.

At its end facing the stator insert element 13, the locking element 31 has, as seen along the axis of rotation of the blocking element 51 and/or the rotor axis 35, a cross-section which has the shape of a preferably symmetrical trapezoid tapering in the direction of the blocking element 51. The legs of this trapezoid form head surfaces 60 on the outside in relation to the locking element 31. The head surface 60 and the corresponding contact surface 17 are inclined to the movement direction of the locking element 31.

If the user is not authorised to unbolt the door, the following procedure occurs. The locking element 31 is initially located in the rest position. A key 200 without locking authorisation is inserted into the key channel 36. The electronic data exchange shows that there is no authorisation to unbolt the door. Therefore, the actuator 52 is not activated and the blocking element 51 remains in a blocking position in which the recess 54 is not located opposite the locking element 31, as represented in FIGS. 4 and 5. Rather, an outer circumference of the blocking element 51 is located opposite the locking element 31.

If the rotor 30 is rotated, the locking element 31 tries to slide along the first contact surface 16. However, this is not possible because the locking element 31 rests on an outer circumference of the blocking element 31. Thus, the locking element 31 cannot be pushed into the second position against the force of the springs 34.

Instead, the stator element 12, which is located in the direction of rotation of the locking element 31, is pushed back by the locking element 31 against the force of the spring 18 until the locking element 31 rests on the second contact surface 17. The stator element 12 is now located in the second position.

In this case, the head surface 60 of the locking element 31 comes into contact with the corresponding second contact surface 17 located opposite one of the legs of the trapezoid.

In this state, the stator element 12 or the stator elements 12 have been moved back in the direction of rotation against the force of a spring element 18. The spring element 18 presses the stator element 12 against the locking element 31 as the rotor 30 continues to rotate.

The contact surface 17 is designed in such manner that the contact surface 17 holds the locking element 31 in the first position. Thus, the rotor 30 remains blocked by the locking element 31 such that the door cannot be unbolted.

Every second contact surface 17 corresponds to a respective head surface 60 of the locking element 31 facing it. The surface 60 and the corresponding contact surface 17 are designed in such manner that the contact surface 17 is located between the surface 60 and the blocking element 51 when the locking element 31 rests on the contact surface 17.

If an attempt is made to rotate the rotor 30 further, the locking element 31 slides away from the blocking element 51 against the movement direction 70. This is achieved by the inclination of the second contact surface 17. The locking element 31 can slide with the head surface 60 along the second contact surface 17. Thus, the locking element 31 and the blocking element 51 can be spaced apart from each other when they rest on the second contact surface 17. Additionally or alternatively, the forces acting on the locking element 31 during further attempted rotation of the rotor 30 are diverted into the second contact surface 17. This is helped by the fact that the head surfaces 60 correspond to the second contact surfaces and thus the locking element 31 lies flat on the second contact surface.

Figure 6:
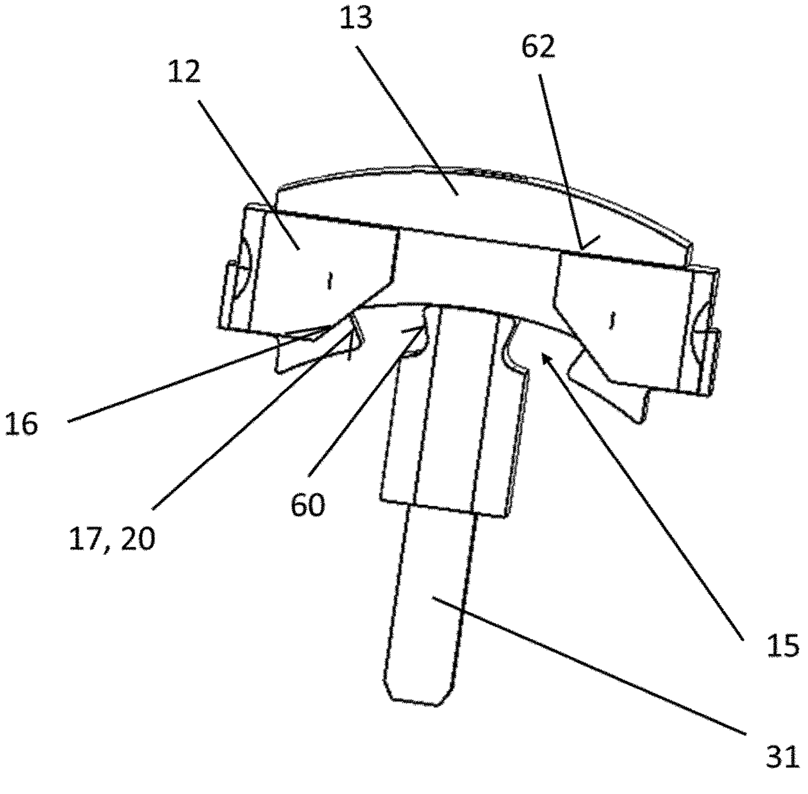

In FIG. 5, the locking element recess is provided with the reference numeral 15. FIG. 6 shows the arrangement of FIG. 5 seen from one end of the locking element 31, only without blocking element 51. Here, the stator elements 12 are located in the second position.

The locking element 31 is surrounded by the second contact surfaces 17 in both directions of rotation such that the rotation in both directions when it rests on one of the second contact surfaces 16 leaves the locking element 31 in the first position.

In the first position of the stator elements 12, the first contact surfaces 16 are located closer to the locking element 31 than the second contact surfaces 17. In the second position of the stator elements, the second contact surfaces 17 protrude further into the locking element recess 15 than the first contact surfaces 16.

The locking element 31 is formed in one piece. As a result, first contact sections 64 of the locking element 31, which serve to rest on the first contact surfaces 16, are rigidly connected to the head surfaces 60, which serve to rest on the second contact surfaces 17. The head surfaces 60 serve as second contact sections here. The first and the second contact sections 60, 64 are rigidly connected to the third contact section 63 of the locking element, which serves for contact in the recess 54.

The stator elements 12 and the stator insert element 13 are arranged in the section of the stator 10 that surrounds the second rotor element 33. Due to the small diameter of the second rotor element 33, it is possible to provide the first and the second contact sections 16, 17 in the stator 10.

The assembly of the installation element 1 is facilitated by the stator comprising a stator body 11 and the stator insert element 13. The cover 14 serves to fasten the stator insert element 13 in the stator body 11. The stator body 11 has a stator recess 19 into which the stator insert element 13 is inserted. The cover 14 covers the stator insert element 13.

FIG. 5 shows selected elements of the installation device 1 from FIG. 4. FIG. 5 thereby shows the arrangement of the locking element 31 in relation to the blocking element 51 and the stator insert element 13 together with stator elements 12.

A transmission element 44, here for example in the form of a coil, is provided to establish a data and/or energy transmission connection with the key 200. This makes it possible to read electronic data, for example authentication information or an opening command, from the key 200 or to receive it from the key 200. The electronic control device 53 is coupled to the transmission element 44 in order to read out the data and, if necessary, evaluate it. If the check of the control device 53 shows that the user of the key 200 is authorised to open the associated door and/or if the control device 53 has an opening command, an electromechanical actuator assembly 50 will be activated.

The transmission element 44 is arranged in the first rotor element 32.

The key channel 36 is provided in the first rotor element 32. Thus, the key channel 36 ends before the actuator 52. The key channel 36 ends before the control device 53. This increases the security against manipulation.

An extension element 40 is provided to interact mechanically with the key 200. If the key 200 is inserted into the key channel 36, it moves the extension element 40 axially or parallel to the rotor axis 35 into an insertion position upon contact.

Preferably, the extension part 40 thereby moves the coupling part 41 away from the rotor 30 in the direction of the driver 103 such that the coupling part 41 can come into rotational engagement with the driver 103. A passage 39 is provided in the connecting section 38 so that the extension element 40 can come into contact with the coupling part 41. Either the extension element 40 or the coupling part 41 can protrude through the passage 39 here.

When the key is removed, the extension element 40 moves axially to the rotor axis in a second direction opposite to the first direction into a removal position. The extension element 40 is pushed into the removal position by a force accumulator 49.

The extension element 40 extends from the first rotor element 32 to the second rotor element 33. As a result, the extension element bridges a distance between the inserted key 200 and/or the key channel 36 and the coupling part 41. This extends the effective range of the key 200.

The first rotor element 32 surrounds the extension element 40 radially.

The second rotor element 33 comprises a guide 65 to axially guide the extension element 40 between the removal position and the insertion position.

The extension element 40 is designed to be angled in the example shown. In this case, a first part of the extension element 40, which is intended for interaction with the key 200, extends radially further outward than a second part of the extension element 40, which is intended for interaction with the coupling part 41. This allows the second part to be arranged more centrally in order to be able to push the coupling part 41 better.

The extension element 40 is designed to push the coupling part 41, but without being in form-fitting engagement with the coupling part 41. Thus, the extension element 40 is movable independently of the coupling part 41. Rather, when the key is removed, the coupling part 41 initially remains engaged.

This allows the extension element to be designed in a filigree manner.

A torque is transmitted from the key 200 to the rotor 30 to the coupling part 41. In this case, no torque transmission takes place via the extension element 40. Rather, the torque is transmitted from the first rotor element 32 to the second rotor element 33, its guide 42 to the coupling part 41. The torque is transmitted from the coupling part 41 to the driver 103 via the insert 105.

The extension element 40 serves to return the blocking element 51 mechanically and/or magnetically from the release position into the blocking position. The extension element 40 can be moved back into the removal position when the key is removed. When the extension element moves into the removal position, a movement of the blocking element 51 into the blocking position can be caused or permitted. For example, a spring represented in relation to the second exemplary embodiment in FIG. 7 can be tensioned during the movement of the blocking element 51 into the release position. When the key is inserted in the insertion position, the extension element 40 holds the blocking element 51 in the release position and allows the blocking element 51 to move back into the blocking position when the extension element 40 moves with the key 200 in the direction of the front side 37 when the key is removed.

A latching element 61 is provided which holds the rotor 30 in position with respect to the stator 10.

The latching element 61 is formed by means of a spring-loaded latching lug by way of example. That is to say that the rotor 30 can overcome the latching lug 61 when rotating such that the function of the rotor 30 is maintained. The latching lug 61 provides haptic feedback to the user that a desired position has been reached. The latching element 61 is arranged to be axially movable. The axial mobility of the latching element 61 is made possible by the different diameters of the rotor elements 32, 33.

The latching element 61 is movably mounted in an opening, not represented, of the stator 10, in particular of the stator body 11. The opening is open to the outside such that the cover 14 delimits the mobility of the latching element 61 outwards. The opening is partially closed inwards such that the latching element 61 is guided in the stator body 11, but partially opened axially and/or inwards such that the latching element 61 can engage in the rotor 30.

Furthermore, the latching lug 61 determines a position in which the key 200 can be inserted and removed. In this position, the locking element 31 is located in the rest position spaced apart from the blocking element 51 such that the actuator 52 can rotate the blocking element 51.

The latching element 61 is provided on the first rotor element 32.

The latching element 61 is axially movable. This is possible due to the different diameters of the first and second rotor elements 32, 33.

An annular projection 22 is formed in particular by means of half-shell-like parts, whose inner surfaces 26 facing each other cooperate with the key 200 in the manner of a bayonet lock. The parts are inserted into a circumferential groove 45 of the first rotor element 32. Outwardly protruding projections 25 of the annular projection 22 fix the parts of the projection 22 in the stator body 11 in their relative position to one another and to the stator body 11. The annular projection 22 acts with the inserted key 200 preferably in a bayonet-like manner as a key removal lock.

The projection 22 has a first protective element part 87 and a second protective element part 90. The protective element parts 87 and 90 have the shape of a half ring and/or have a rectangular ring cross-section. On the outer circumferential surface of the protective element parts 87 and 90 are located projections 25 which engage into recesses in the stator when the protective element parts 87 and 90 are mounted thereon.

Figure 8:
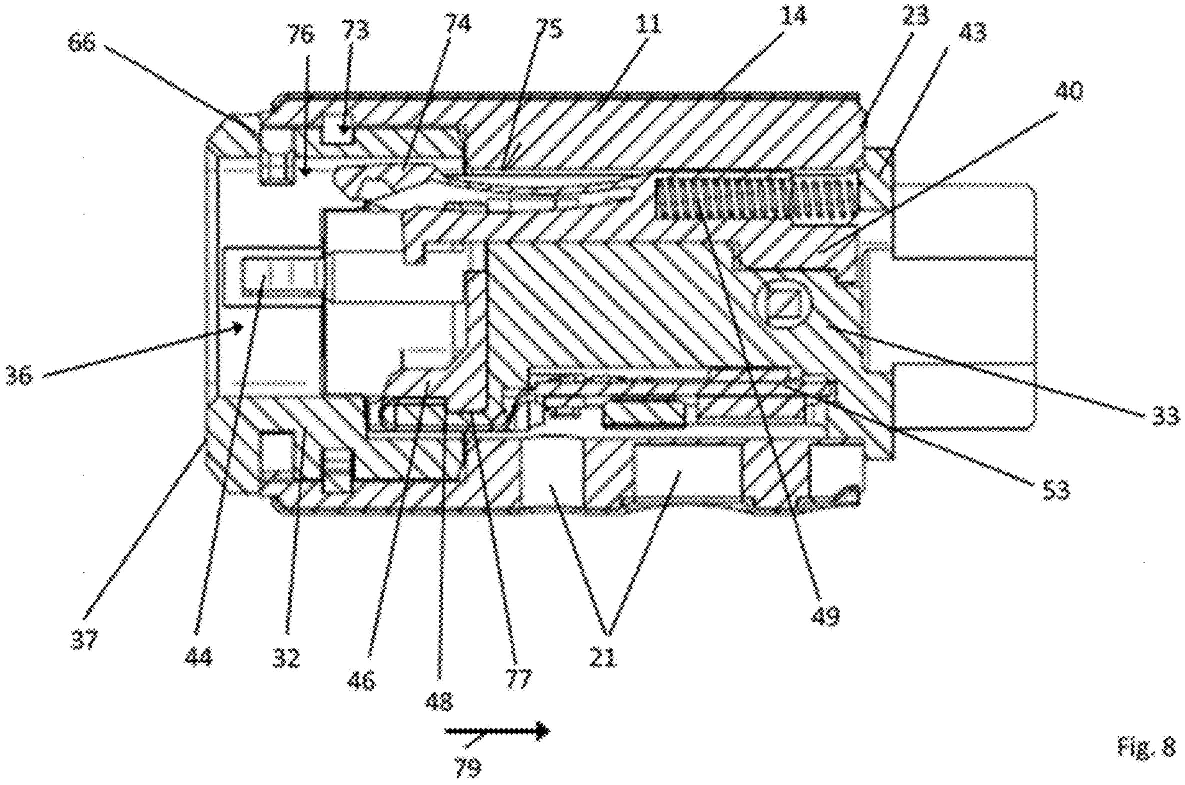
Figure 9:
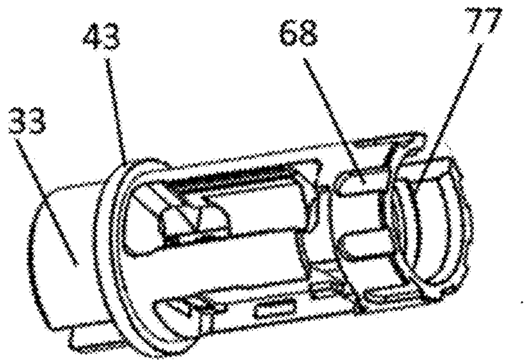

FIGS. 7 to 9 show a further exemplary embodiment of an installation device 1 designed as an installation device. Unless described below, the second exemplary embodiment corresponds to the first exemplary embodiment.

FIG. 7 thereby shows the installation device 1 without cover 14 and stator body 11 in a partially dismantled state. FIG. 8 shows a sectional representation.

Instead of the screw 24, the first rotor element 32 comprises fastening means 67 and the second rotor element 33 comprises corresponding fastening means 68, which engage in a form-fitting manner such that the first rotor element 32 and the second rotor element 33 are fastened to one another in a rotationally fixed manner. Here, the first and second fastening means 67, 68 are designed as projections and corresponding recesses.

Instead of the coil as a transmission device 44, contact elements are provided which transmit data and/or electrical energy to the installation device 1 via an electrical contact with the key 200. The contact elements 44 are fastened resiliently on a housing 46.

The housing 46 also serves to axially fasten the rotor elements 32, 33 to one another. Thus, the housing 46 serves as a latching device. For this purpose, the housing 46 comprises a first latching element 47 which latches into the first rotor element 32. For this purpose, the first rotor element 32 comprises an edge 78. The housing 46 comprises a second latching element 48 which latches into the second rotor element 33. For this purpose, the second rotor element 33 comprises a groove 77.

The first rotor element 32 is axially fixed by a snap ring 72, both in the direction of arrow 79 and against the direction of arrow 79. The snap ring 72 is arranged in a groove 73 of the first rotor element 33.

The latching element 61 is arranged in the stator 10 and engages into a recess 69 of the first rotor element 32.

As in the first exemplary embodiment, the extension element 40 is moved into the removal position by the spring 49. In addition, the extension element 40 comprises a resilient engagement element 74. The engagement element 74 is provided to engage into the key 200. By engaging the engagement element 74 in the key 200, the extension element 40 can be moved from the insertion position into the removal position when the key is removed, e.g. if a movement by the spring 49 has been prevented by manipulation.

The engagement of the engagement element 74 takes place in that the engagement element 74 in the insertion position on an inner side 75 of the stator body 11, which the second rotor element 33 rests counter to the resilient action of the engagement element 74 and is pushed to engage in the key 200. In the removal position, which is represented in FIG. 8, the engagement element 74 is located in a cavity 76 in the interior of the first rotor element 32. This makes it possible for the engagement element 74 to slide out of the key 200 due to the resilient force and/or chamfers.

The cavity 76 merges into the key channel 36.

FIG. 9 shows the second rotor element 33. Here, a groove 77 is represented, which is designed to engage with the latching element 48. The groove 77 also serves as a predetermined breaking point. In the event of a manipulation attempt, the second rotor element 33 breaks apart at the groove 77, with the essential part of the second rotor element 33 with the control device 53 and the actuator group 50 remaining in the stator 10.

In the second exemplary embodiment of FIGS. 7 to 9, a spring device 88 is provided. The spring device 88 is designed as a leaf spring which is adapted to the contour of the projection 22, with the projection 22 being inserted in a groove 45 of the rotor 30, in particular of the first rotor element 32. This results in a simple assembly, since the projection 22 is clamped to the first rotor element 32 by the spring device 88 similar to a snap ring. However, the rotor 30 can be rotated without the projection 22 rotating together with the spring device 88 such that during a rotation of the key 200, the projection 22 is fastened in the stator 10 in a rotationally fixed manner.

The spring device 88 is adapted to the contour of the projection 22 and is applied to its outer circumference. Thus, the projection 22 and the spring device 88 are designed in such manner that they are particularly small and easy to assemble.

Figure 10:
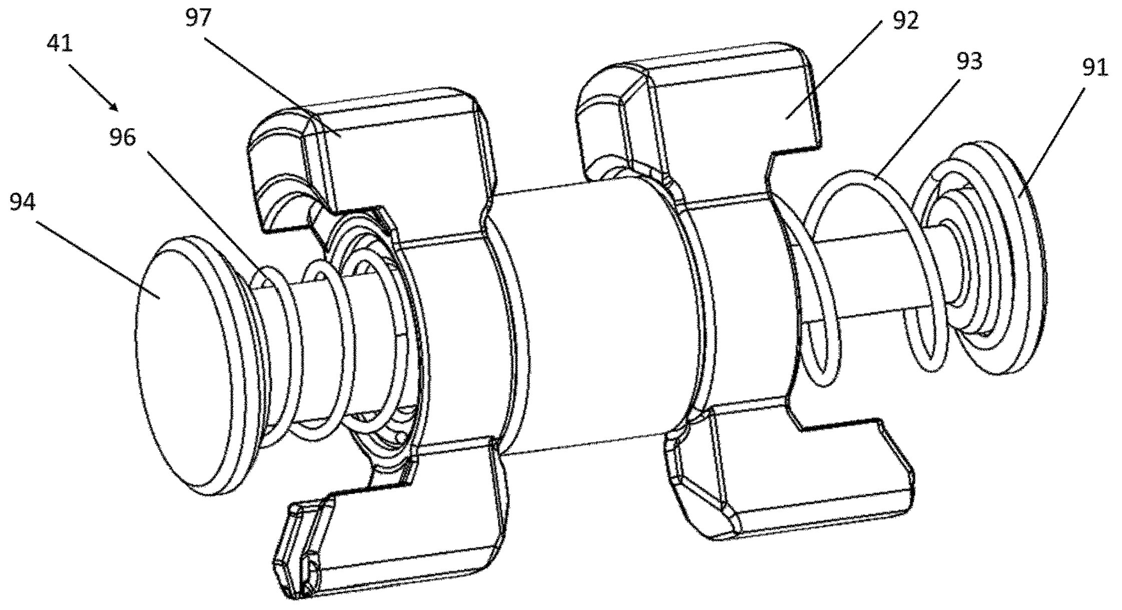
FIG. 10 a representation of a coupling part of the locking device from FIG. 1 and FIG. 11 a representation of an alternative coupling part of the locking device according to the disclosure.

As represented in FIG. 10, the coupling part 41 is designed in a plurality of parts. The coupling part 41 comprises a sliding element 91, a coupling element 92 and a spring 93. The sliding element 91 is guided in a channel 38*a* of the connecting section 38.

The sliding element 91 is displaced by the extension element 40 when the extension element 40 moves from the removal position into the insertion position. The coupling element 92 is provided to be guided in the guide 42 and to be in operative connection with the driver 103 in a coupling position. If the sliding element 91 is displaced when the key 200 is inserted and the insert 105 and the coupling element 92 are located in a geometrically matching spatial position relative to one another, the coupling element 92 is also displaced via the spring 93, such that the coupling element 92 comes into the coupling position, i.e. into engagement with the insert 105 and thus into operative connection with the driver 103. If the sliding element 91 is displaced when the key 200 is inserted and the insert 105 and the coupling element 92 are in a spatial position that does not geometrically match one another, the spring 93 is tensioned and the coupling element 92 initially remains in an decoupling position until the insert 105 and the coupling element 92 can assume a geometrically matching spatial position relative to one another and the coupling element 92 reaches the coupling position due to the force of the spring 93. In both the coupling position and the decoupling position, the coupling element 92 is arranged in the guide 42. In the decoupling position, the coupling element 92 is further away from the driver 103 than in the coupling position.

In order to allow a small installation space for the locking device 1, it is provided that the key 200 pushes the extension element 40 into the insertion position without an intermediate force accumulator. The extension element 40 pushes the coupling part 41 without an intermediate force accumulator. Rather, the force accumulator in the form of the spring 93 is provided outside an interior of the locking device 1 in the connecting section 38.

The extension element 40 is designed to push the coupling part 41, but without being in form-fitting engagement with the coupling part 41. For this purpose, the extension element comprises a section 86. Thus, the extension element 40 is movable independently of the coupling part 41. Rather, when the key is removed, the coupling element 92 initially remains in the coupling position. However, in the removal position, the extension element allows a movement of the coupling element 92 into the decoupling position. As a result, the driver 103 is connected to the stator 10 via the coupling element 92, the second rotor element 33 and the locking element 31 such that the driver 103 cannot rotate when the key is removed. This provides good protection against manipulation.

A movement of the coupling element 92 into the decoupling position can take place, for example, by pressing on another sliding element 94. The sliding element 94 can, for example, be part of another locking device on the other side of the door. When a key is inserted into the other locking device, the sliding element 94 is displaced. As a result, a further coupling element 95 is pushed into a coupling position with the driver 103, either directly or by tensioning another spring 96. At least when the key of the locking device 100 according to the disclosure is removed, the coupling element 92 is displaced from the coupling position into the decoupling position.

Figure 11:
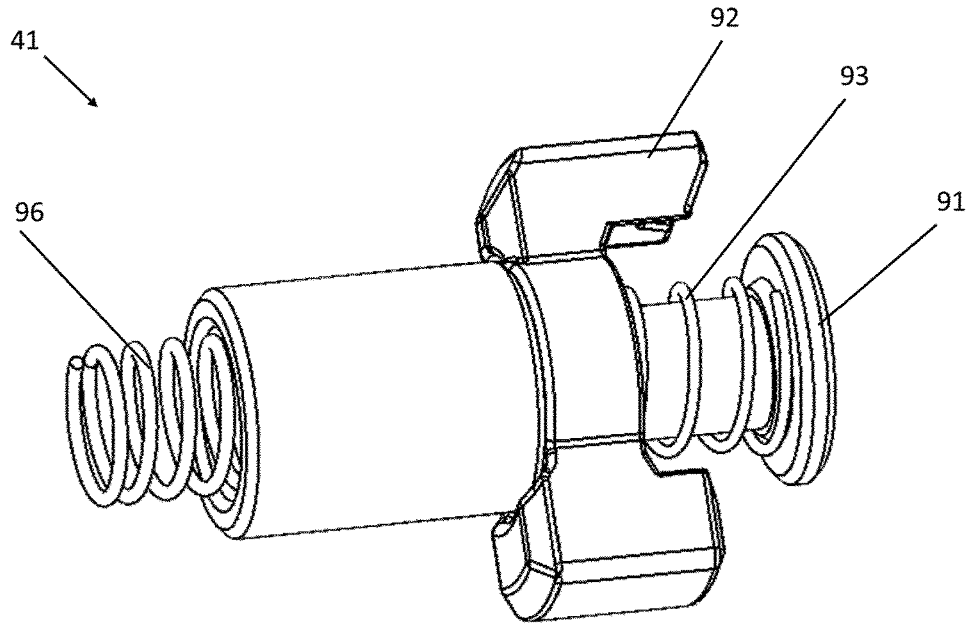

FIG. 11 shows another exemplary embodiment of a coupling part 41 of a locking device 100 according to the disclosure. For example, the coupling part 41 of FIG. 11 is used when a knob is used on the other side of the door. The knob is firmly connected to the driver 103. If the key 200 is removed from the locking device 100 according to the disclosure and the extension element 40 is moved into the removal position, the coupling element 92 will be pressed into the decoupling position by the force of the spring 96.

The installation device 1 according to the first or second exemplary embodiment can also be used in other locking devices, for example in a half cylinder, a knob cylinder, a furniture cylinder or a padlock.

It is conceivable that the coupling part 41 is missing in the installation device 1 according to the disclosure. Rather, locking devices according to the disclosure can be provided in which the driver 103 is rigidly fastened to the rotor 30. The driver 103 can also be used as a bolt itself, e.g. in a furniture lock. The driver 103 and the insert 105 can be formed integrally with each other.

The stator insert element 13 and the stator body 11 can be formed in one piece. It is also conceivable that the cover 14 is missing and the stator body is fastened directly in the locking device housing 101.

It may be that the actuator moves the blocking element 51 back to the blocking position. This can be provided in particular for knob cylinders.

The blocking element 51 can alternatively be designed in the shape of a plunger. In this case, a preferably bistable magnet is used as the actuator. The plunger can be spring-loaded in one direction, preferably away from the magnet.

Elements of the first exemplary embodiment can be implemented in the second exemplary embodiment and vice versa. For example, the second exemplary embodiment can comprise a coil as the transmission device 44 or the first exemplary embodiment can comprise contact elements as the transmission device 44. For example, the rotor elements 32, 33 of the first exemplary embodiment can be fastened to one another as in the second exemplary embodiment. The extension element 40 of the first exemplary embodiment and the second exemplary embodiment can be interchanged. The axial fixing of the first rotor element 32 with respect to the stator can be carried out according to the first or second exemplary embodiment.

The installation device 1 according to the disclosure can be inserted into a switching element housing, not represented. This creates a switching element that can only trigger a switching process if the user has electronic authorisation. This uses a driver that rotates with the rotor 30 and actuates a switch. Due to the installation device 1 according to the disclosure, it is not necessary to provide a locking element recess in the switching element housing itself. Rather, the stator 10 and the switching element housing together form a fixed component.

The design of the disclosure is not restricted to the preferred exemplary embodiment indicated above. In fact, a number of variants is conceivable which make use of the represented solution even in the case of fundamentally different designs. All features and/or advantages emerging from the claims, the description or the drawings, including constructive details or spatial arrangements, may be essential to the disclosure by themselves and in the most varied combinations.

The invention claimed is:

1. An electromechanical installation device for insertion into a locking cylinder locking device, wherein the locking device is designed as a locking cylinder, as a knob cylinder, as a furniture cylinder or as a padlock, or into a switching element, with a stator for insertion into a locking device housing or into a switching element housing, and with a rotor as components and with a locking element, wherein the rotor is mounted in the stator, wherein the locking element is mounted in one of the components, wherein the locking element can be moved between a first position and a second position, wherein the locking element in the first position connects the rotor and the stator and blocks a rotation of the rotor in the stator, wherein the locking element in the second position allows a rotation of the rotor in the stator, wherein the installation device comprises an electromechanical actuator, wherein the actuator is used to enable the locking element to be movable into the second position, wherein the rotor houses the electromechanical actuator and wherein the installation device comprises a key channel for inserting a key, wherein the installation device comprises an extension element, wherein the extension element is designed to move in a first direction, axially to a rotor axis of the rotor, when a key is inserted, and to move in a second direction counter to the first direction axially to a rotor axis when the key is removed.

2. An installation device according to claim 1, wherein the locking element is mounted in the rotor, wherein the stator comprises a locking element recess, wherein the locking element engages into the locking element recess of the stator in the first position.

3. The installation device according to claim 1, wherein the stator is designed to be cylindrical.

4. The installation device according to claim 1, wherein the stator comprises at least one opening which is designed to receive a fastening element passed through the locking device housing or the switching element housing for the rotationally fixed fastening of the stator to the locking device housing.

5. The installation device according to claim 1, wherein the stator comprises a plurality of openings in order to receive a fastening element when inserted into different locking device housings or switching element housings.

6. The installation device according to claim 4, wherein the stator comprises a stator body and a cover, wherein the cover encloses the stator body, wherein the opening is formed in the stator body and in the cover.

7. The installation device according to claim 1, wherein the stator comprises a stator insert element, wherein the stator insert element is inserted in the stator body, wherein the stator insert element at least partially comprises the locking element recess, wherein the stator insert element is covered by the cover from the outside.

8. The installation device according to claim 1, wherein the extension element is located in the interior of the installation device where the actuator and the locking element are located.

9. The installation device according to claim 8, wherein the extension element is designed to displace a coupling part, wherein the extension element is designed to be movable independently of the coupling part (41), a coupling element of the coupling part, wherein the coupling part can be arranged outside the stator, in a guide of the rotor, and/or wherein the coupling part, the coupling element, remains in a coupling position when the extension element moves in the second direction.

10. The installation device according to claim 8, wherein a torque can be transmitted from the rotor (30) to the coupling part without the extension element transmitting the torque, wherein the extension element is designed to cooperate with the coupling part without a form-fitting connection.

11. The installation device according to claim 1, wherein the stator comprises a base side which is designed to be directed inwards and/or towards a driver of the locking device in the installed state, and the rotor comprises a projection, wherein the projection rests on the base side, wherein the projection is formed integrally with a connecting section and/or with a guide for the locking element and/or with an installation space for an actuator assembly.

12. The installation device according to claim 1, wherein the installation device is free of mechanical coding.

13. A locking cylinder locking device with an inserted installation device according to claim 1, wherein the locking device is designed as a locking cylinder, as a knob cylinder, as a furniture cylinder or as a padlock.

14. The locking device according to claim 13, wherein the locking device comprises a fastening element, wherein the fastening element is inserted from the outside through a recess of the locking device into the locking device housing in order to fasten the stator to the locking device housing in a rotationally fixed manner, wherein the fastening element is designed as a screw or as a clamping bolt.

15. The locking device system with a plurality of locking devices, wherein the locking devices each comprise an installation device according to claim 1, wherein the installation devices are each designed identically, wherein the locking devices comprise locking device housings that are different from one another.

16. The installation device according to claim 1, wherein the rotor is divided into a first section and a second section, wherein the first section houses the key channel and the second section receives the electromechanical actuator, wherein the extension element extends from the first section to the second section.

17. The installation device according to claim 1, wherein the installation device comprises a blocking element, wherein the blocking element can be moved by the actuator into a release position, wherein the blocking element allows the movement of the locking element from the first position into the second position in a release position and prevents the movement of the locking element from the first position into the second position in a blocking position, wherein the extension element serves to return the blocking element mechanically and/or magnetically from the release position into the blocking position.

* * * * *